United States Patent [19]

Van Der Wal et al.

[11] Patent Number: 5,758,567

[45] Date of Patent: Jun. 2, 1998

[54] TOASTER WITH MAINS-POWER-ON SAFETY DEVICE

[75] Inventors: Roelf Van Der Wal; Jacob H. Botma, both of Drachten, Netherlands

[73] Assignee: U.S. Philips Corporation, New York, N.Y.

[21] Appl. No.: 841,915

[22] Filed: Apr. 17, 1997

[30] Foreign Application Priority Data

Apr. 29, 1996 [EP] European Pat. Off. ............ 96201173

[51] Int. Cl.$^6$ .................................................. A47J 37/08
[52] U.S. Cl. ............... 99/331; 99/337; 99/389; 219/464; 219/492; 219/497; 219/501
[58] Field of Search ................... 99/389–391, 385, 99/325–333, 337, 338; 219/497, 501, 464, 492, 494, 505, 521

[56] References Cited

U.S. PATENT DOCUMENTS

| | | |
|---|---|---|
| 4,454,803 | 6/1984 | Wolf et al. ............ 99/329 RT |
| 4,487,115 | 12/1984 | Su ............................ 99/327 |
| 4,503,758 | 3/1985 | Carville ............... 99/329 RT |
| 4,510,376 | 4/1985 | Schneider ............... 219/492 |
| 4,755,656 | 7/1988 | Charlesworth et al. ...... 219/501 |
| 5,088,389 | 2/1992 | Fresno ....................... 99/327 |
| 5,438,914 | 8/1995 | Hohn et al. ............ 99/332 X |

*Primary Examiner*—Timothy F. Simone
*Attorney, Agent, or Firm*—Robert J. Kraus

[57] ABSTRACT

A toaster has electrical parts which are energized from a mains voltage. The bread is conveyed to a toasting chamber (4) by means of a lift (6) and a handle (12). In the end position of the handle (12) a main switch (SW5) is turned on, as a result of which the electrical parts can be powered from the mains voltage. The heating elements receive mains voltage via triacs controlled by a microcontroller. After completion of the toasting cycle the microcontroller turns off the heating elements, which precludes burning of the bread, even if the main switch remains in its on-position as a result of a mechanical defect. Subsequently, the microcontroller checks the presence of the mains voltage. In that case a signalling device is activated to warn the user that the mains voltage supply to the toaster has not yet been turned off.

5 Claims, 3 Drawing Sheets

TOASTER WITH MAINS-POWER-ON SAFETY DEVICE

BACKGROUND OF THE INVENTION

The invention relates to a toaster having electrical parts which are energized from a mains voltage, comprising: a toasting chamber for receiving a product to be toasted, at least one heating element for heating the product, a transport device for moving the product into the toasting chamber, and a main switch, which can be activated by the transport device, to connect the electrical parts to the mains voltage.

Toasters of this type are generally known. The bread to be toasted is inserted into the toasting chamber and is exposed to heating by the heating element. The number of heating elements depends on the type of toaster. A common type has two heating elements, the slice being interposed between the heating elements and both sides being toasted at the same time. The slice of bread is brought into the toasting chamber with the aid of a transport device by pushing down a handle. When the end position of the handle is reached the main switch is turned on, as a result of which mains voltage is supplied to the toaster and the heating elements are energized. A locking device ensures that the end position is maintained until toasting is finished. After expiry of the toasting time the handle is released, as a result of which the transport device automatically lifts the toasted slice of bread. The main switch is then also turned off, so that all the electrical parts are disconnected from the mains voltage and, as a result, the heating elements are also turned off. If the mechanism of the transport device falters or jams, the heating elements will remain energized and the bread to be toasted will eventually be charred. For the user this is generally a sign that there is something wrong with the toaster and the user will pull the mains plug out of the wall outlet to preclude further damage and may attempt to repair the locking mechanism by hand or by means of a tool.

SUMMARY OF THE INVENTION

It is an object of the invention to provide a toaster with improved safety. To this end, according to the invention, the toaster of the type defined in the opening paragraph is characterized in that the toaster further comprises: a controllable switch for turning on and turning off the at least one heating element.

By turning off the heating elements with a controllable switch, for example a relay or a triac, after expiry of the toasting time, charring or burning of the product to be toasted is prevented and a higher fire safety is obtained.

After expiry of the toasting time the heating elements are turned off by means of a suitable control signal applied to the controllable switches. In that case the bread will not be charred if the transport mechanism jams. However, the bread remains stuck in the toaster. The user is then still tempted to take action in order to mend the locking mechanism. However, the user is not aware that mains voltage is applied to the electrical parts in the toaster because the main switch is still in the on-position. Now there is a high risk that during his repair attempts the user comes into contact with the mains voltage, particularly when use is made of metal knives and forks which are ready to hand.

In order to mitigate this hazardous situation an embodiment of the toaster in accordance with the invention is characterized in that the toaster further comprises: a signalling device, means for detecting the mains voltage after turning-off of the heating element, and means for activating the signalling device in response to the detection of the mains voltage.

By checking whether mains voltage is present after completion of the toasting process, it is possible to warn the user against the unsafe situation which has arisen as a result of failure of the main switch to open automatically. The signalling device can be implemented in various ways. Existing pilot lamps or a special lamp can light up or blink together or in accordance with a given pattern in order to give the user a visual indication. Instead of or in combination with this, it is also possible to produce an acoustic signal by means of a loudspeaker or buzzer.

BRIEF DESCRIPTION OF THE DRAWING

These and other aspects of the invention will be described and elucidated with reference to the accompanying drawing figures, in which.

In these figures like parts bear the same reference symbols.

DESCRIPTION OF THE PREFERRED EMBODIMENT

Figure 1:
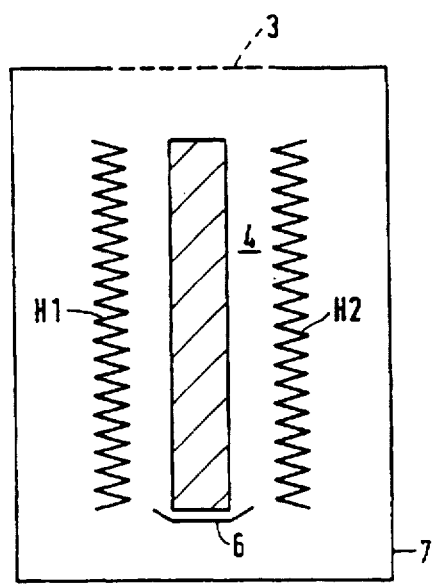
FIG. 1 is a cross-sectional view of an embodiment of a toaster in accordance with the invention.

FIG. 1 is a cross-sectional view showing an embodiment of a toaster in accordance with the invention. The toaster comprises a casing 7 which encloses a toasting chamber 4, in which two heating elements H1 and H2 are disposed at either side of one or more slices of bread 5, which can be brought into the toasting chamber 4 by means of a lift 6 via a slot 3 in the casing 7. The radiating surfaces of the heating elements H1 and H2 extend horizontally in the longitudinal direction of the toaster and face the slice of bread 5.

Figure 2:
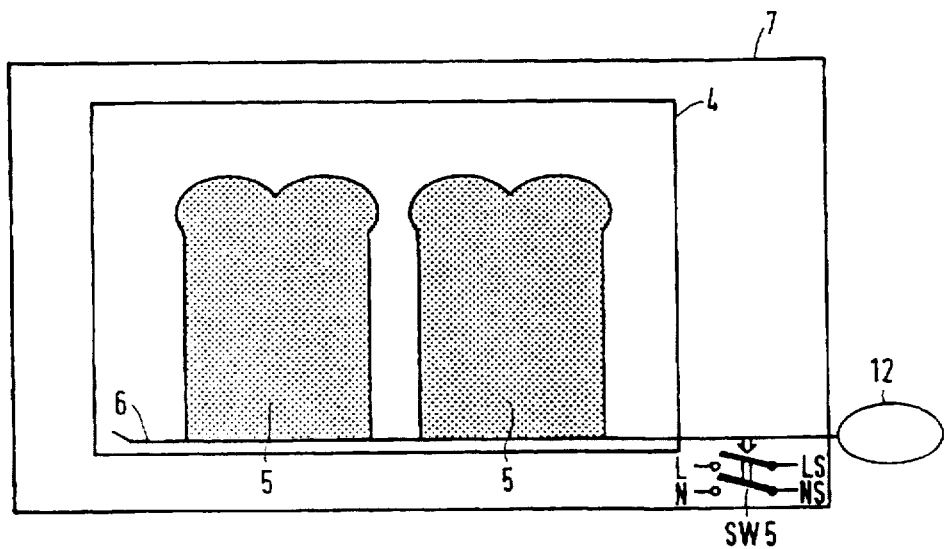
FIG. 2 is a longitudinal sectional view of an embodiment of a toaster in accordance with the invention.

FIG. 2 is a longitudinal section view showing the toaster. The product 5 to be toasted, shown as two slices of bread 5 in FIG. 2, is placed on the lift 6 and is conveyed into the toasting chamber 4 by means of a handle 12. When the end position of the lift 6 is reached the contacts L/LS and N/NS of a main switch SW5 are closed, as a result of which all the electrical parts of the toaster are coupled to the mains voltage and the toaster is put into operation. The handle 12 and the lift 6 are held in this position by means of a locking mechanism, not shown, which is released after expiry of a toasting cycle, as a result of which the lift 6 goes up automatically under the influence of a spring or another mechanism, which are not shown either. The contacts of the main switch SW5 then open again, as a result of which the electrical parts are no longer coupled to the mains voltage.

Figure 3:
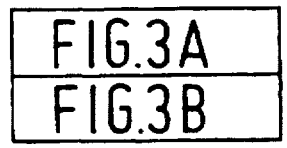
FIGS. 3, 3A and 3B are diagrams of an electric circuits for use in an embodiment of a toaster in accordance with the invention.
Figure 3A:
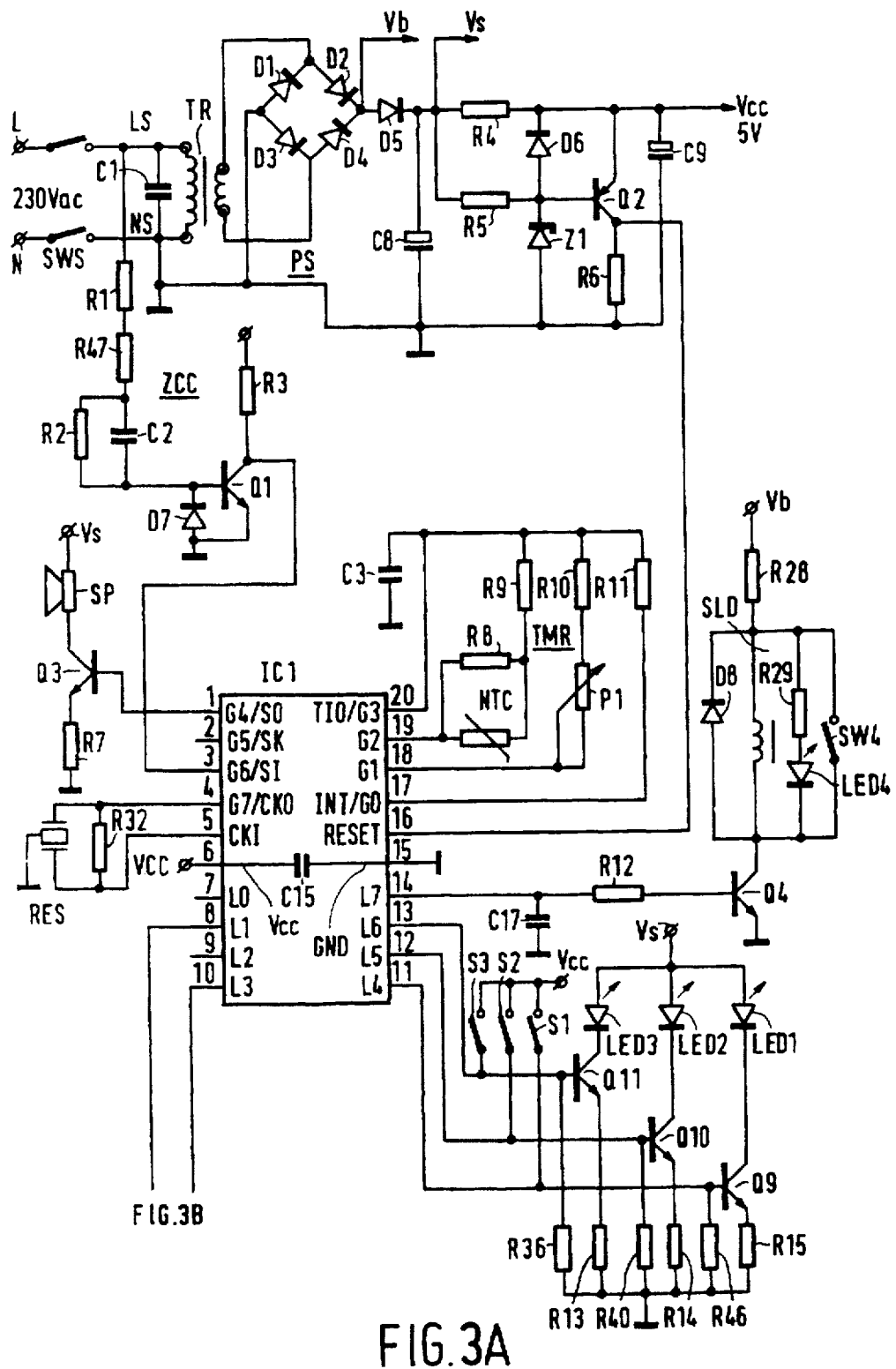
Figure 3B:
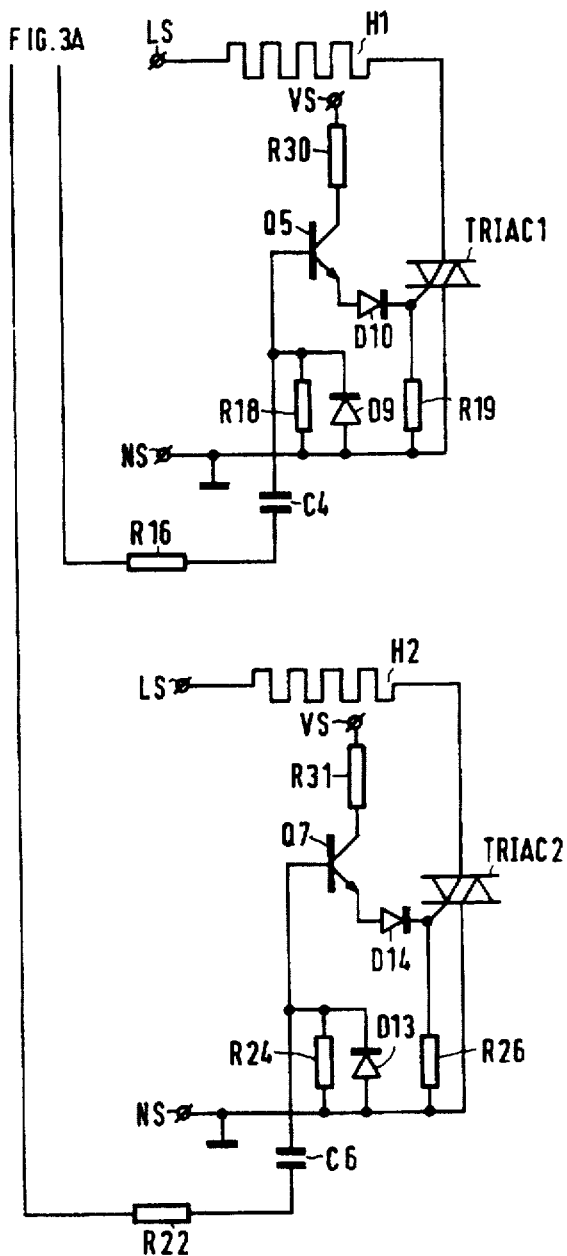

FIGS. 3A and 3B show an electrical circuit diagram of the toaster in FIGS. 1 and 2. When the control handle 12 is pushed down the contacts of a main switch SW5 are closed in the end position of the lift 6, as a result of which the mains voltage on the terminals L and N is transferred to the terminals LS and NS, the terminal NS being connected to signal ground. A transformer TR transforms the high mains voltage to a lower voltage, which is rectified by means of a rectifier bridge D1–D4, yielding a raw voltage Vb which energizes a solenoid SLD via a resistor R28. The raw voltage Vb is smoothed by a capacitor C8 via a diode D5, yielding a supply voltage Vs. The diode D5 prevents the capacitor C8 from being discharged through the solenoid SLD. The supply voltage Vs is further smoothed by a resistor R4 and a capacitor C9 and is reduced to a supply voltage Vcc of, for example, 5 V. The voltage Vcc is connected to the emitter of a PNP transistor Q2, which has its collector connected to ground via a resistor R6 and which has its base connected to ground via a zener diode Z1. The zener diode Z1 receives a bias current derived from the supply voltage Vs via a resistor R5. The sum of the base-emitter voltage of the transistor Q2 and the zener voltage of the zener diode Z1 determines the magnitude of the supply voltage Vcc. When the mains voltage is turned on by means of the main switch SW5 the supply voltage Vs increases. The base of the transistor Q2 follows this increase until the zener voltage of the zener diode Z1 is reached. The supply voltage Vcc also increases but it increases more slowly than the supply voltage Vs owing to the resistor R4 and the capacitor C9. When a given value of the supply voltage Vcc is reached the transistor Q2 is turned on and the voltage across the resistor R6 increases rapidly from zero volts to approximately the supply voltage Vcc. The voltage variation across the resistor R6 is used to reset a microcontroller IC1. A diode D6 between the base and the emitter of the transistor Q2 protects the base-emitter junction of the transistor Q2 against excessive reverse voltages.

Upon receipt of the supply voltage Vcc and the reset pulse the microcontroller IC1 (type COP842CN) is put into operation, the clock frequency being determined by a resonator RES (for example a ceramic resonator at 5 MHz) with a parallel resistor R32. The microcontroller IC1 turns on a driver transistor Q4 via a resistor R12, which transistor is arranged in series with the solenoid SLD. As a result, the contacts of the main switch SW5 remain energized until the microcontroller IC1 turns off the driver transistor Q4, or until the solenoid SLD is short-circuited by means of a switch SW4 across the solenoid SLD, which switch is actuated by the user of the toaster. The lift 6 and the handle 12 are then released and the lift 6 moves the toasted bread outward.

The heating element H1 has one terminal connected to the terminal LS. By means of a first electronic switch TRIAC1 the other terminal is connected to the terminal NS for receiving the mains voltage. By means of a second electronic switch TRIAC2 the other heating element H2 is connected to the terminals LS and NS.

The trigger electrode of the electronic switch TRIAC1 receives control pulses from the emitter of an NPN transistor Q5 via a diode D10, which transistor has its collector connected to the supply voltage Vs via a resistor R30. A resistor R19 between the trigger electrode of the electronic switch TRIAC1 and the terminal NS prevents triggering in the absence of control pulses. The diode D10 prevents an undesirable turn-on of the transistor Q5 if the mains voltage on the terminal LS is negative relative to the terminal NS. The base of the transistor Q5 receives control pulses from the microcontroller IC1 via a series resistor R16 and a coupling capacitor C4. The base of the transistor Q5 is connected to the terminal NS via a resistor 18 in parallel with a diode D9. The cathode of the diode D9 is connected to the base of the transistor Q5, as a result of which the negative base-emitter voltage of the transistor Q5 cannot become smaller than one diode voltage. The coupling capacitor C4 prevents the electronic switch TRIAC1 from being fired in the event of malfunctioning of the microcontroller IC1.

The other electronic switch TRIAC2 is controlled by means of similar electronic control circuitry. The microcontroller IC1 turns the electronic switches on and off in accordance with a Multi Cycle Control pattern, in which the electronic switches are on or off during full cycles of the mains voltage. For this purpose the microcontroller IC1 receives information from a zero cross circuit ZCC, which converts the sinusoidal mains voltage into a squarewave voltage of suitable amplitude and phase. The zero cross circuit ZCC comprises an NPN transistor Q1, which has its emitter connected to the terminal NS and which has its base connected to the terminal LS via three series-connected resistors R1, R47 and R2. The collector of the transistor Q1 is connected to the supply voltage Vcc by a resistor R3 and supplies a limited mains voltage to the microcontroller IC1. A capacitor C2 parallel to the resistor R2 ensures that the signal transients in the limited mains voltage are in phase with the zero crossings of the mains voltage. A diode D7 prevents an excessive reverse voltage across the base and the emitter of the transistor Q1. Instead of by means of triacs and Multi Cycle Control the elements can also be activated by means of other electronic switches such as relays.

The toasting time is adjusted by means of a timer circuit TMR, the microcontroller IC1 comparing the resistance value of a control potentiometer P1 and a series resistor R10 with that of a reference resistor R11 by charging a capacitor C3 and subsequently discharging it via the reference resistor R11 and via the potentiometer P1 and the resistor RIO, and comparing the discharge times. The microcontroller IC1 further measures the temperature in the toaster by comparing the resistance of a resistor circuit including a temperature-dependent resistor NTC with the reference resistor R11. This enables the on-time to be corrected for a cold or warm toaster.

By means of the switches S1, S2 and S3 a number of program options can be selected, indicators LED1, LED2 and LED3 indicating which options have been selected. By means of the switch S1 one-side toasting can be chosen. In that case only one of the heating elements H1 or H2 is active. By means of the second switch S2 it is possible to correct the toasting time for frozen bread, and by means of the third switch S3 the toasting time is limited to a fixed duration. The indicators LED1, LED2 and LED3 can be arranged in the casing 7 at a location which is conspicuous to the user.

After completion of the toasting cycle the microcontroller turns off the heating elements H1 and H2 and de-energizes the solenoid SLD, as a result of which the lift 6 is released and the main switch SW5 is opened. Turning off the heating elements H1 and H2 prevents the product to be toasted from being burnt and thereby precludes fire hazard. If the lift 6 and/or the handle 12 remain stuck or the main switch is not opened for whatever reason, the user will not perceive that the mains voltage supply to the toaster has not ceased after completion of the toasting cycle. Indeed, the heating elements H1 and H2 no longer radiate. The user may now be tempted to repair the failing release mechanism in the toaster, which is still energized with the mains voltage. In order to warn the user against the hazardous consequences of such an attempt, a signalling device has been provided. For this purpose, the microcontroller IC1 is programmed to make one or more of the indicators LED1, LED2 and LED3 blink, either at the same time, after one another, or in another conspicuous pattern some time after completion of a toasting cycle, i.e. after the heating elements have been turned off. It is alternatively possible to use a separate indicator for this purpose. Instead of or in combination with visual indicators the microcontroller IC1 can generate an acoustic signal. For this purpose the microcontroller IC1 turns a loudspeaker SP or a buzzer on and off via a driver transistor Q3 by means of a suitable squarewave voltage on the base of the driver transistor Q3. Thus, the user is warned by means of an audible signal.

Instead of a microcontroller it is also possible to use separate electronic circuits, particularly commercially available timers, zero cross detectors and triac drivers, in order to implement the described functions of the toaster.

An embodiment is disclosed of a toaster having electrical parts which are powered from a mains voltage. The bread is moved into a toasting chamber by means of a lift and a handle. In the end position of the handle a main switch is turned on, as a result of which the electrical parts can be powered from the mains voltage. The heating elements receive mains voltage via triacs or other controllable switches which are controlled by a microcontroller or a timer. After completion of the toasting cycle the microcontroller turns off the heating elements, as a result of which the bread cannot be burnt, even if the main switch remains in its on-position owing to a mechanical defect. Subsequently, the microcontroller checks whether the mains voltage is still present. In that case a signalling device is activated, which warns the user against the fact that the mains voltage supply to the toaster has not yet been turned off.

What is claimed is:

1. A toaster including a toasting chamber for receiving a product to be heated, at least one heating element for heating the product, transport apparatus for moving the product into the chamber, and first switching means actuable by the transport apparatus for supplying electrical power to circuitry of the toaster, said circuitry comprising:

a. second switching means for controllably connecting electrical power to the at least one heating element; and b. control circuitry for controlling operation of the second switching means to effect disconnection of power to the at least one heating element, upon the completion of heating, regardless of the state of actuation of the first switching means.

2. A toaster as in claim 1 including a signalling device and means for actuating said signalling device upon detecting the supply of electrical power by the first switching means after disconnection of power to the heater by the second switching means.

3. A toaster as in claim 2 where the signalling device comprises a visual indicator.

4. A toaster as in claim 2 where the signalling device comprises an acoustic signalling device.

5. A toaster as in claim 3 where the signalling device comprises an acoustic signalling device.

* * * * *